Aug. 3, 1926.  
J. H. FREY  
LAWN MOWER  
Filed Nov. 10, 1925  
1,594,504
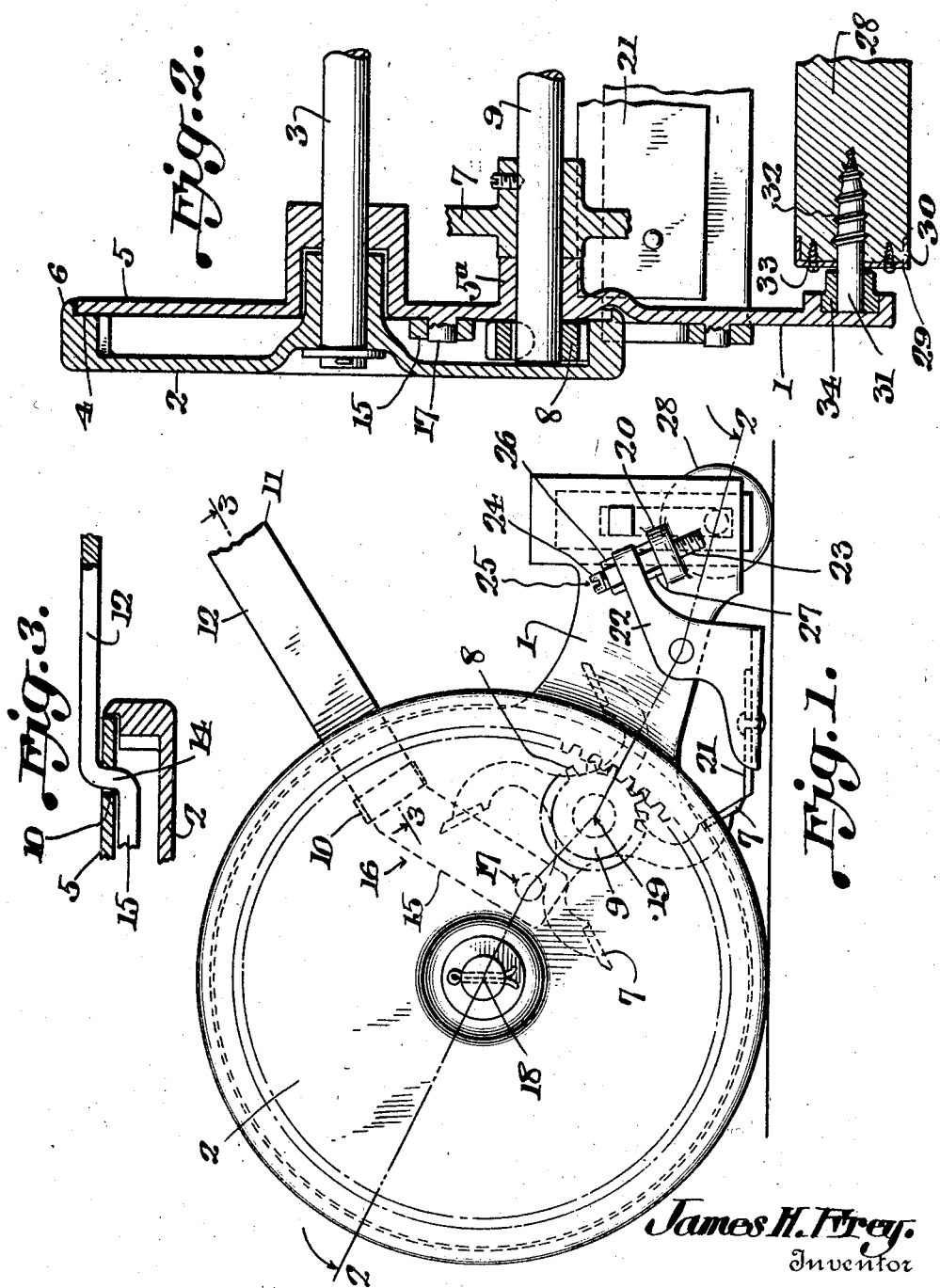
James H. Frey.
Inventor Patented Aug. 3, 1926.

1,594,504

UNITED STATES PATENT OFFICE.

JAMES H. FREY, OF WILMAR, CALIFORNIA.

LAWN MOWER.

Application filed November 10, 1925. Serial No. 68,145.

The device forming the subject matter of this application is a lawn mower, and one object of the invention is so to construct the inner edge of the drive wheel that it will not bark or damage trees and shrubbery.

Another object of the invention is to provide novel means for mounting the handle of the lawn mower on the frame plate thereof.

A further object of the invention is to provide novel means for adjusting the position of the shear which cooperates with the rotary cutter.

Another object of the invention is to improve the roller.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention; Figure 2 is a section on the line 2—2 of Figure 1; Figure 3 is a section on the line 3—3 of Figure 1.

The lawn mower forming the subject matter of this application comprises a frame plate 1, and a ground-engaging drive wheel 2 supported at 3 for rotation on the frame plate, and having a recess 4 receiving a part 5 of the frame plate, the drive wheel 2 being beveled, convexedly rounded, or otherwise constructed, as shown at 6, at its inner edge, transversely of the said part 5 of the frame plate, and in substantial alinement therewith, to prevent the inner edge of the drive wheel from damaging shrubbery, trees and the like. A rotary cutting means 7 is supported at 9 on the part 5 of the frame plate 1 and is driven from the ground wheel 2 by the usual cog gearing 8.

The frame plate 1 has a slot 10, located beyond the periphery of the rotary cutting means 7. The machine includes a handle member 11 comprising a body 12 extended along the inner surface of the part 5 of the frame plate 1 and having a lateral extension 14 passing through the slot 10 and located beyond the periphery of the rotary cutting means 7, thereby permitting the end of the rotary cutting means to be disposed close to the inner surface of the part 5 of the frame plate 1. The extension 14 has an arm 15 disposed about parallel to the frame plate part 5 and extended along the inner surface of said part, the arm being downwardly inclined, as shown at 16 in Figure 1, and being disposed at an obtuse angle to the body 12 of the handle member 11, the arm 15 being pivoted at 17 to the part 5 of the frame plate 1 at a point slightly below and to the rear of the axis of rotation of the ground wheel, and above and in front of the axis 19 of rotation of the cutting means 7.

The frame plate 1 has an outstanding lug 20. A shear 21 cooperates with the rotary cutting means 7 and comprises an arm 22 pivotally mounted intermediate its ends on the frame plate 1. A screw 23 is threaded into the lug 20 and extends through the arm 22. The screw 23 is supplied with a head 24 which is squared, flattened or rendered otherwise of polygonal form, so that the screw may be rotated by means of a wrench. The head 24 of the screw 23 has also, in its end, a kerf 25, so that the screw may be rotated by a screw driver. A nut 26 may be threaded on the screw 23, the nut cooperating with the arm 22, and another nut 27, threaded on the screw, cooperating with the lug 20, the nuts serving to hold the screw in any position to which it may have been adjusted, either by means of a wrench or by means of a screw driver. The function of the screw 23, of course, is to adjust the position of the shear 21 with respect to the rotary cutting means 7.

A roller 28 is located to the rear of the shear 21. On the end of the roller 28 is placed a cap 29 which has a flange 30 surrounding the end of the roller 28 and preventing the roller from slipping. A stud 31 is fixed in the cap 29, the inner end of the stud being in the form of a wood screw, threaded at 32 into the roller 28, the roller generally being fashioned from wood. Securing devices 33, such as screws, may be used to attach the cap 29 to the roller 28, although this detail is not insisted upon. The outer end of the stud 31 is supported for rotation, as at 34, in the frame plate 1.

Although the machine has been described at one end only, and in the singular number, it will be understood that the construction shown in the drawings is duplicated at the other side of the machine.

What is claimed is:—

A lawn mower comprising a frame plate, a ground-engaging drive wheel supported for rotation on the frame plate, rotary cutting means journaled on the frame plate and operated by the drive wheel, the frame plate having a slot located beyond the periphery of the rotary cutting means, and a handle member comprising a body extended along the inner surface of the frame plate and having a lateral extension passing through the slot and located beyond the periphery of the rotary cutting means, thereby permitting the end of the rotary cutting means to be disposed close to the inner surface of the frame plate, the extension having an arm disposed substantially parallel to the frame plate and extended along the inner surface of the frame plate, the arm being downwardly inclined and being disposed at an obtuse angle to the body of the handle members, the arm being pivoted to the frame plate at a point slightly below and to the rear of the axis of rotation of the ground wheel.

In testimony that I claim the foregoing as my own, I have hereto affixed my signature.

JAMES H. FREY.